UNITED STATES PATENT OFFICE.

JAMES MacKAYE, OF CAMBRIDGE, MASSACHUSETTS, ASSIGNOR TO RIVER SMELTING & REFINING COMPANY, OF ST. LOUIS, MISSOURI, A CORPORATION OF MAINE.

BASIC FERRIC SULFATE AND METHOD OF PREPARING SAME.

1,316,909.  Specification of Letters Patent.  Patented Sept. 23, 1919.

No Drawing.  Application filed September 13, 1918. Serial No. 254,022.

*To all whom it may concern:*

Be it known that I, JAMES MACKAYE, a citizen of the United States, residing at Cambridge, in the county of Middlesex and State of Massachusetts, have invented an Improvement in Basic Ferric Sulfate and Methods of Preparing Same, of which the following is a specification.

My invention relates to the production of a basic ferric sulfate, soluble in dilute sulfuric acid, from ferrous sulfate or commercial copperas and to the product so made.

In the preparation of a ferric salt, either for use as purifier for salt solutions such as zinc sulfate solutions used in the production of electrolytic zinc, or for other purposes, it has been customary to start with the cheapest salt of iron, generally copperas, or ferrous sulfate. It is necessary to oxidize these salts, either dry or in solution, to the corresponding ferric form and this oxidation has been attended with considerable difficulty and expense.

I have found, however, that copperas, or crystallized ferrous sulfate, in a more or less powdered or granular form, under certain conditions, may be converted into a ferric salt which is soluble in sulfuric acid, by air alone and without other treatment and in a comparatively short time.

It is well known that copperas, when exposed to the action of the air at normal temperature is superficially converted very slowly into a basic ferric sulfate, but a conversion of copperas by this means to a ferric soluble in sulfuric acid is not practicable.

It is also well known that ferrous sulfate, when heated to a high degree, is converted to a ferric form, ferric oxid. In this form it is insoluble in dilute sulfuric acid, or practically so, and consequently cannot be used.

I have found, however, that when copperas, or ferrous sulfate, in a more or less powdered or granular form is subjected to a moderate degree of heat in contact with air, the ferrous salt is rapidly converted into a basic ferric sulfate soluble in dilute sulfuric acid without other treatment, and whereas, by the heating of the ferrous salt to a high degree, it is converted to an insoluble ferric form, the moderate heating of the ferrous salt in finely divided form in contact with air converts it into a soluble ferric form which, upon standing a few hours in contact with dilute sulfuric acid, goes into solution.

I find that at a temperature of from 200° to 300° centigrade in contact with air the ferrous sulfate is readily converted to the basic ferric sulfate invented by me which is soluble in dilute sulfuric acid although the temperature at which the salt is treated in the presence of air may vary considerably without appreciably affecting the results of the process. Temperatures much lower than those cited result in an incomplete or impractically slow oxidation, while temperatures greatly exceeding those cited render the product insoluble in dilute sulfuric acid and so unavailable for use in electrolytic zinc processes. However, as before stated, the temperature to which the ferrous sulfate may be heated may depart considerably from the values cited without appreciably affecting the results of the process.

Any type of apparatus may be employed in which the copperas is heated in the presence of air. Preferably it should be such that the heated granules or particles of copperas are continually agitated during their treatment to thereby facilitate their conversion.

A type of apparatus well suited for the purpose is the common rotary drier which consists merely in a rotatable iron cylinder heated to the required temperature by any suitable means. The cylinder is preferably provided, on the inside, with radial fins which, as the cylinder rotates, continually lift and drop the particles and thereby expose them constantly to the action of the air.

The material may be fed continuously through the drier by rotating the cylinder on an axis slightly inclined to the horizontal, or the cylinder may be rotated on a horizontal axis and the copperas oxidized in batches.

In the above described treatment of the copperas, the resultant product assumes the form of very fine dust which may escape in considerable quantities from the open ends of the oxidizing cylinder. To prevent this objectionable escape of product the ends of the cylinder may be closed to prevent the exit of the dust but not closed for the entrance of air to the copperas under treatment. If desired, one end of the oxidizing cylinder may be connected with a gas filter of any suitable construction and the other end left open and the air necessary for the oxidizing of the material may be drawn through the filter from the open end of the cylinder by means of a fan.

Whereas I have described a simple type of apparatus well adapted for the conversion, by heat, of copperas or ferrous sulfate, to a soluble ferric form, basic ferric sulfate, yet other types of apparatus may also be equally efficacious in operation. In fact, the material could be made by heating in a dish and stirring the heated product with a spoon.

It is well known that in practice there is no definite chemical formula for basic ferric sulfate and the product of my process is no exception to the rule but my compound is readily distinguished from other basic ferric sulfates by the fact that it is readily soluble in dilute sulfuric acid, although not rapidly, and is reasonably stable so far as this quality is concerned.

The water of crystallization in copperas enters into the reaction to the extent necessary to complete the product, and, of course, if an anhydrous ferrous sulfate were used, the necessary elements should be added to complete the basic ferric sulfate as by the addition of moisture in some form.

The conversion of the copperas need not be completely carried out. A conversion of over 98% is readily obtained by my method and in practice this process need not be further continued.

I claim:

1. The method of oxidizing ferrous sulfate to basic ferric sulfate soluble in dilute sulfuric acid which consists in moderately heating ferrous sulfate in granular form in contact with air.

2. The method of oxidizing ferrous sulfate in undissolved form to basic ferric sulfate which consists in heating said ferrous sulfate at an elevated temperature below that at which it is converted into ferric form insoluble in dilute sulfuric acid in intimate contact with air.

3. The method of oxidizing ferrous sulfate in undissolved form to basic ferric sulfate which consists in heating said ferrous sulfate at a temperature below that at which it is converted into ferric form insoluble in dilute sulfuric acid in intimate contact with air.

4. The method of preparing a basic ferric sulfate which consists in subjecting copperas in granular form to a temperature from about 200 degrees to about 300 degrees centigrade in intimate contact with an excess of air.

5. The method of preparing a basic ferric sulfate which consists in subjecting ferrous sulfate in granular form to a temperature from about 200 degrees to about 300 degrees centigrade in intimate contact with an excess of air by agitation.

6. A basic ferric sulfate characterized by being soluble in dilute sulfuric acid as described.

In testimony whereof, I have signed my name to this specification, in the presence of two subscribing witnesses.

JAMES MacKAYE.

Witnesses:
H. B. DAVIS,
T. T. GREENWOOD.

Copies of this patent may be obtained for five cents each, by addressing the "Commissioner of Patents, Washington, D. C."